United States Patent [19]

Perry

[11] 3,811,036

[45] May 14, 1974

[54] MICRO-BIOLOGICAL COLONY COUNTER

[75] Inventor: Russell C. Perry, Smithtown, N.Y.

[73] Assignee: Artek Systems Corp., Farmingdale, N.Y.

[22] Filed: Sept. 19, 1972

[21] Appl. No.: 290,403

[52] U.S. Cl......... 235/92 PC, 235/92 R, 235/92 EC, 340/324 A

[51] Int. Cl. .......................................... G06m 11/02

[58] Field of Search235/92 PC; 340/324 A, 324 AD, 340/26

[56] References Cited

UNITED STATES PATENTS

| | | | |
|---|---|---|---|
| 3,720,812 | 3/1973 | Downs | 235/92 PC |
| 3,408,485 | 10/1968 | Scott | 235/92 PC |
| 2,791,695 | 5/1957 | Bareford | 235/92 PC |
| 3,344,259 | 9/1967 | Degelman | 235/92 PC |

*Primary Examiner*—Paul J. Henon
*Assistant Examiner*—Robert F. Gnuse
*Attorney, Agent, or Firm*—Leonard H. King

[57] ABSTRACT

An automatic colony counter which includes a television camera for viewing a sample being scanned. The output from the television camera is sent through control circuitry to a television monitor. The video signal is also processed and quantized to produce a digital count representing the number of colonies counted and also to produce a flag signal which causes an illuminated dot to be superimposed on each colony counted, thereby insuring that all the colonies in the sample have been counted.

18 Claims, 12 Drawing Figures

MICRO-BIOLOGICAL COLONY COUNTER

The aforementioned Abstract is neither intended to define the invention of the application which, of course, is measured by the claims, nor is it intended to be limiting as to the scope of the invention in any way.

This invention relates to a Micro-Biological colony counter and display apparatus and more particularly to a television scan system which provides a digital count of microbiological colonies on a medium together with a television display of the colonies being scanned.

BACKGROUND OF THE INVENTION

A major part of micro-biological research includes the formation of colonies of micro-organisms on a medium which are subsequently counted wherein the count of the colonies is used to determine the effectiveness of various chemicals. Such colony counting is used in laboratory work, bio-medical facilities and also in industry. For example, the number of organisms in a blood agar may be counted in a research laboratory or a physician may make a culture of an infections organisms during an examination. Also, in quality control of food and beverage industries the number of micro organisms in a product must regularly be checked.

One of the basic difficulties with colony counting is that a trained laboratory technician is required to analyze the culture and count the colonies. In some instances up to one thousand colonies can be counted and such colonies may be as small as 0.2 millimeters and spaced as close as 0.3 millimeters. As a result, such counting is extremely time consuming, generally inaccurate, and exceedingly costly both in time and required skilled labor.

Accordingly, it is an object of this invention to provide an automatic colony counter which gives a digital readout of the number of colonies on a medium.

Another object of the invention is to provide a colony counter which provides a digital count of the number of colonies and at the same time provides a T.V. picture of the sample being counted.

A further object of the invention is to provide a micro-biological colony counter which can display the sample together with an illuminated dot automatically superimposed over every colony that has been counted.

Yet a further object of the invention is to provide a micro-biological colony counter which provides as an output a digital count of the number of colonies, such that the output can further be used as input information to a computer or a printout system.

Still a further object of the invention is to provide an automatic colony counter having electronic circuitry including a television camera which scans the sample, processes the signal, and converts it into a digital count while simultaneously displaying the sample on a television monitor.

Another object of the invention is to provide a colony counter which can count both surface and sub-surface colonies on membrane filters as well as in petri dishes.

These and other objects of the invention will become more apparent from a full description to be given hereafter taken in conjunction with the FIGS.

BRIEF DESCRIPTION OF THE INVENTION

Briefly, the invention includes a closed loop television circuit having a television camera focusing on a sample containing a plurality of colonies in a medium. The video signal output from the camera is processed to form a series of pulses along horizontal scan lines wherein each pulse represents the width of the colony. The pulses in consecutive scan lines relating to a single colony are gated together thereby producing a single count for each colony. The count is sent to a counter for display of the total number of colonies. At the same time, the video signal from the television camera is sent to a television monitor for displaying the actual sample being scanned. The digital pulse representing the initial detection of a colony causes the television monitor to illuminate that location, thereby automatically superimposing an illuminated dot over each colony that has been counted.

DESCRIPTION OF THE INVENTION

Figure 1:
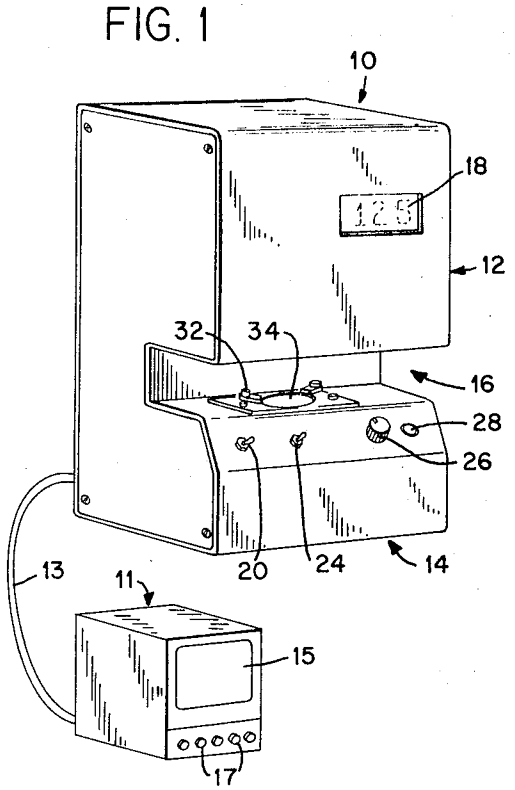
FIG. 1 is a pictorial view of the colony counter unit in conjunction with a television monitor.

Referring now to FIG. 1, there is shown a pictorial view of the automatic apparatus of the present invention including the colony counter shown generally at 10 interconnected to a television monitor 11 by a cable 13. The colony counter is in a case having an upper portion 12 and a lower portion 14 with a slotted section 16 therebetween. The upper portion 12 contains a readout display 18 which gives the digital count of the number of colonies in the sample being monitored. The lower portion 14 contains a toggle switch 20 which is the on-off switch; a second toggle switch 24 which permits automatic continuous scanning of the sample at a fixed rate when in one position and manual scanning control when in its second position. The lower portion of the colony counter 14 further includes a level adjust knob 26 which controls the setting for proper visibility of the illuminated dots on the television monitor. A push button switch 28 operates in conjunction with switch 24 such that when switch 24 is in its manual position, each time the push button 28 is depressed the digital portion of the counter provides a permanent reading on the digital readout 18 until the next time the button 28 is depressed. The sample to be counted is placed in the slotted section of the colony counter such that it abuts the aligning stops 32 and is placed over the clear window 34.

The size of the unit 10 is small enough to be placed on a table and the slotted portion 16 is high enough to permit an operator to easily slip his hand therein to replace the samples to be counted. The case is so arranged to have flat exterior surfaces to permit it to be easily cleaned and disinfected from contamination. Samples can be placed in the slotted section with their translucent covers on them, thereby reducing the operator's risk of coming into contact with harmful bacteria and other micro-biological organisms which might cause serious infection.

The colony counter provides a video output which feeds a television monitor 11 through the cable 13. The monitor is shown as a separate unit thereby permitting portable remote television monitoring wherein the television monitor 11 may be placed at a convenient location for an operator to view the picture with ease while the colony counter unit 10 is placed at a remote location. Alternatively, the television monitor screen could be included directly in the same case as the counter 10. As it is shown, the monitor 11 includes a screen 15 and a plurality of control knobs 17 similar in use and operation as the focusing and control knobs of a television set.

Figure 2:
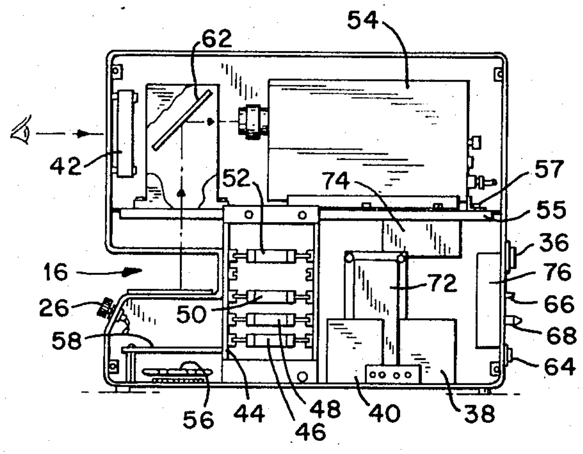
FIG. 2 is a right side view of the colony counter shown in FIG. 1 having the outer wall of the casing removed to reveal the internal circuitry.
Figure 4:
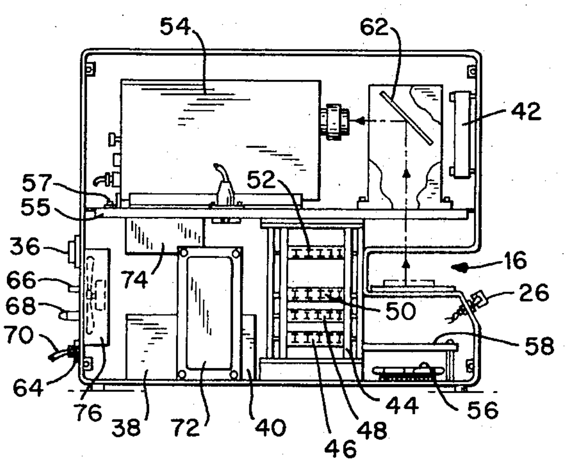
FIG. 4 is a left side view of the colony counter with the side wall of the case removed.
Figure 3:
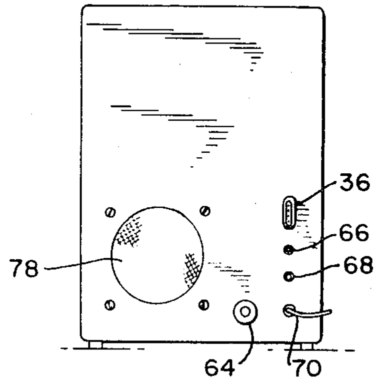
FIG. 3 is a rear view of the colony counter.

Referring now to FIGS. 2 through 4, there are shown various views of the colony counter unit 10 of FIG. 1, wherein the side panels of the case have been removed in FIGS. 2 and 4 thereby revealing the internal circuitry arrangement of the apparatus and a rear view with the case on is shown in FIG. 3. Located at the rear of the apparatus is a socket 36 which provides a digital output similar to the digital value displayed on the readout display 18. This output enables an external interface unit to couple the digital output reading to any computer or printout system.

The colony counter unit includes a five volt power supply 38 which supplies the power for the logic voltage for all the integrated circuits in the apparatus plus the readout assembly. A 12 volt power supply 40 is located adjacent thereto and is mounted on the chassis frame. This power supply provides voltage to the analog circuits contained in the apparatus. The logic circuitry is formulated out of integrated circuits placed on logic cards of which 42 is the digital readout card located on the front inside of the case with its lighted display visible through the front panel. This provides the readout display shown at 18 in FIG. 1. This printed circuit assembly receives count pulses from the rest of the circuit, totalizes the count pulses, stores displays and updates the count periodically.

Located in the bottom card slot of the logic rack 44 is a video processor card 46 which is formed as a removable plug in printed circuit assembly. This assembly accomplishes the operational functions required on the main video signal in order to further process the colony count data. Also provided on this assembly is a precision delay line that restores the processed video display signals on the television monitor in the proper time/phase relationship.

Located in the card slot position directly above the video processor card is the quantizer card 48. This assembly provides further video processing as well as signal to noise ratio enhancement. The output from this card is a signal data which is ready for colony counting. Located in the third card position from the bottom of card rack 44 is the control card 50. This card provides numerous control signals for the overall operation of the colony counter system including the horizontal television synchronizing pulses; vertical television synchronizing pulses; vertical grid positioning; horizontal grid positioning; start/stop grid signals; gated colony count signal; and the television monitor amplifier drive circuitry.

Located in the top position of the logic rack 44 is the shift card 52 which provides the grid system for locating colonies. The grid system is derived from a high frequency oscillator and further includes a shift register and gating system. The illuminated digital dots which appear on the television monitor screen as each colony is identified are generated on this card assembly.

A specialized television camera 54 is provided to produce the necessary video information to the logic system. The television camera is attached to the internal shelf 55 located above the slotted position, by fastening means 57 as, for example, a bolt from the underside of the shelf.

The optical system for illuminating the sample and transmitting the light through the system to the television camera includes a mercury vapor lamp 56 located on the bottom of the chassis beneath the slotted section 16 which sends its lights through the opal glass 58 and through the clear window 34 (shown in FIG. 1) to the underside of the sample. After the light passes through a sample placed on the clear window, it is reflected off surface mirror 62 and is detected by the television camera 54.

A foot switch (not shown) can be connected to the rear of the chassis through plug 64. When the foot switch is connected, data may be registered by depressing either data entry button 28 (FIG. 1) which is located on the front panel of the case or alternately by depressing the foot switch.

The video output is taken from the rear of the cabinet at 66 and is fed into the separate television monitor unit. A fuse 68 is placed in series with the line 70 to protect the device from overloads and shorts. A line voltage regulator 72 which consists of a Sola transformer and capacitor line voltage regulator, is located on the chassis frame and supplies a constant AC voltage to the precision television camera system. An AC transformer 74 is located under the camera shelf 55 and supplies the high voltage AC to operate the mercury vapor lamp 56 which serves as the illuminating means for the system. A fan 76 mounted onto the back panel and located adjacent to a screen opening 78 on the back panel removes the heat from the numerous electronic devices.

Figure 5:
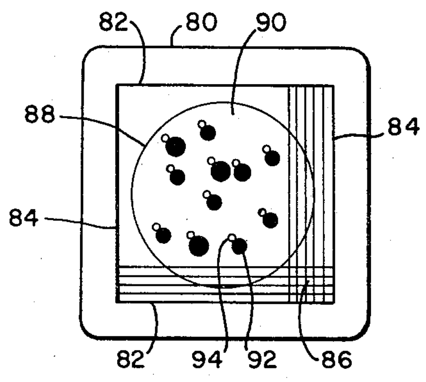
FIG. 5 shows a scanned sample as it appears on the television screen.

Referring now to FIG. 5, there is shown a sample scanned by the present colony counter displayed on the television monitor. The complete television raster is shown at 80 and includes the outer periphery of the television screen. Within the television raster 80 there is a window formed by horizontal lines 82 and vertical lines 84. Within the window a grid system appears, part of which is shown at 86 in the bottom right-hand corner. Within the window the total sample is visible. In the example shown the sample is a petri dish whose outer perimeter is seen at 88 and it contains an agar medium 90 on which there are numerous colonies 92. Associated with each colony is an illuminated dot 94 which appears after the sample has been scanned and indicates that that particular colony has been counted. By means of the illuminated dot, hereinafter referred to as a "flag," it is possible for an operator to insure himself that all of the colonies have been counted. This illuminated dot is automatically superimposed over the colonies counted and provides a means of quality control of the instrument. It also avoids the necessity of double checking the count of the instrument manual counting.

Figure 6:
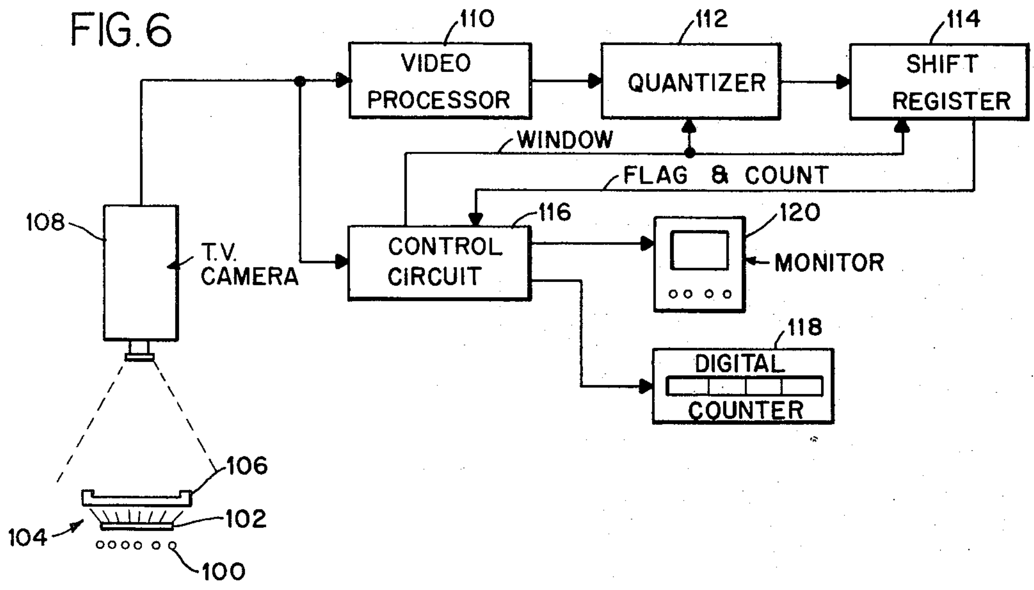
FIG 6 is a block diagram of the overall circuitry of the system.

Referring now to FIG. 6, there is shown an overall block diagram of the system circuitry heretofore generally described with respect to FIGS. 1 through 4. For bacteriological colony dishes it has been found advantageous to illuminate the samples by a through lighting system. The lighting system consists of a light source 100 which can be either a multiple number of individual lamps or a zig-zag single lamp which produces an even illumination. In the present embodiment a mercury vapor lamp has been found most beneficial for providing the illumination. An opal glass 102 is placed over the illumination source to further diffuse the lamp irregularities. However, direct diffusing of the illumination source immediately under a bacteriological dish produces a shadowing effect on the colonies. To avoid this phenomena, the opal glass diffusing light source is placed a distance of a few inches below the dish as shown by the space 104. The object to be viewed 106 is placed within the view of the television camera 108 which provides a standard television scan picture feeding the video signals to the video processor 110. The signals are therein differentiated and amplified and are then sent to a quantizer 112 where a pulse is formed representing the width of a colony along a horizontal scan line. The pulse is then sent to a shift register 114 which retains the pulses for an entire line and as each subsequent line is fed into the shift register, it gates the output and produces a flag signal and a count signal. The flag signal represents the first detection of a colony and causes the illuminated dot to appear on the television monitor. The count signal represents the presence of a colony. The signals are sent to a control circuit 116 which appropriately averages the digital count over a number of frames and then sends it to a digital counter and output display 118. The video signal from the television camera 108 is also sent directly to the control circuit which takes this video signal together with the flag signal and with appropriate television output circuitry sends the signals to a television monitor 120 for visual display of the scanned dish 106 as well as the illuminated dot superimposed on each colony counted. The control circuit 116 also uses the video input to form the horizontal and vertical window defining the outer perimeter of the scanning picture and sends the window to the quantizer as well as to the shift register where the grid system is produced.

Figure 7:
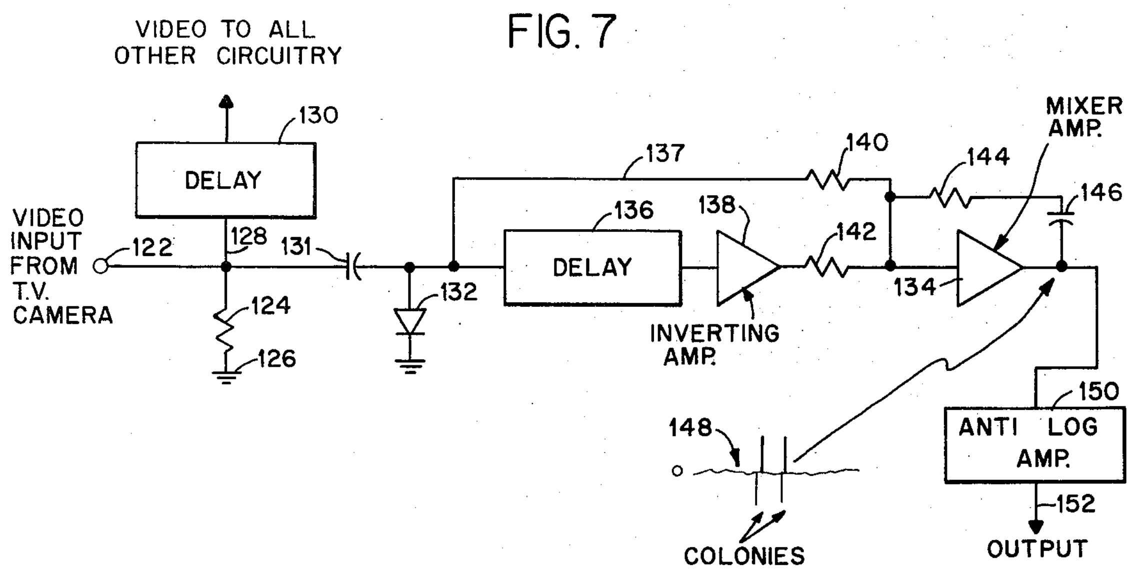
FIG. 7 is a block diagram of the videoprocessor.

Referring now to FIG. 7, there is shown a more detailed block diagram of the video processor shown generally at 110 at FIG. 6. In FIG. 7 the video input from the television camera enters at 122 through a delay 130 and then proceeds to the control circuit as will hereinafter be described. The purpose of the delay 130 is to permit the presentation of the flags and other digitized television data in real time on the television monitoring system. If the delay was not included, flags and other digitized television data would appear before the object to be identified. Resistor 124 connected between the input 122 and ground 126 serves as a terminating resistor for the cable interconnecting the television camera and the video processor.

The video signal also passes through a DC clamping circuit comprising capacitor 131 and diode 132. This prevents drift and offset problems in the differential amplifier system included within the processing.

In order to remove the effects of sloping and other non-linear vidicon effects which generally result from television systems, the video signal, which is now in the form of pulses representing the colonies, is first differentiated. Such differentiation is preformed by sending the video signal directly into the mixer amplifier 134 along line 137 and sending the same signal into the mixer amplifier 134 through a delay 136 and an inverting amplifier 138. The delay 136 can be accomplished by either a lump constant delay line or a delay which is realized from the use of multiple amplifier stages. Resistors 140, 142 are adjusted to produce a near perfect differentiated signal.

Due to the nature of the circuitry which follows the differentiator, it is necessary to eliminate all overshoots which are present at the differentiator output. This is accomplished through the use of a series RC network including resistor 144 and capacitor 146 connected between the input and output terminals of the mixer amplifier 134. The output signals from the differentiator are therefore small width pulses corresponding to the leading and trailing edges of each colony. One such series of pulses are shown at the output of the amplifier at 148.

Further signal to noise ratio improvement at the differentiator output may be accomplished by use of an additional negative or anti-log amplifier or by a multiplying amplifier network. In the present embodiment an anti-log amplifier 150 has been employed. However, other devices could be used as is known in the art. The output from the video processor appears at 152.

Figure 8:
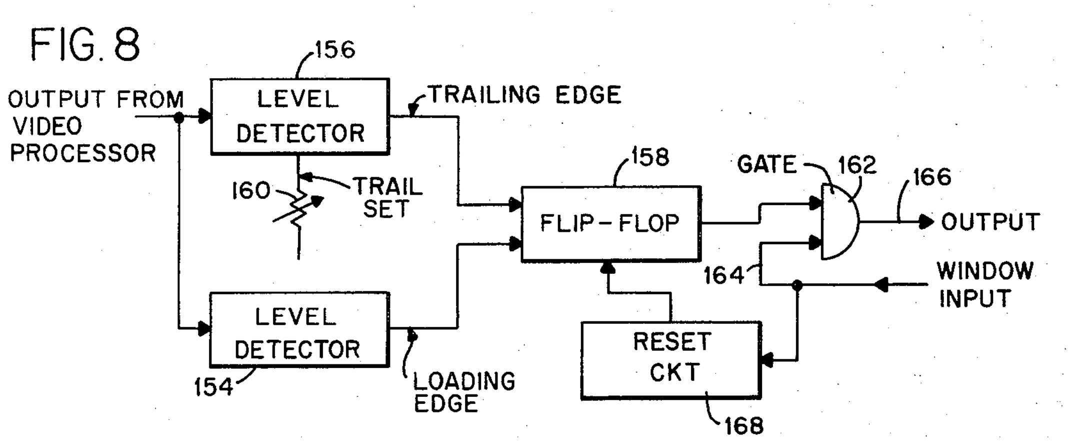
FIG. 8 is a block diagram of the quantizer.

Signals from the video processor are fed into the quantizer circuit shown in more detail in FIG. 8. The consecutive small width pulses representing the beginning and end of each colony along a horizontal scan line is first separated with one pulse, referred to as the leading edge pulse, sent through level detector 154 and the subsequent pulse, referred to as the trailing edge, sent through level detector 156. Level detection is therefore preformed both on the leading and trailing edges of each colony pulse resulting in the restoration of a digital pulse signal whose width is a function of the colony detected. This pulse is found through the use of a flip-flop circuit 158. The double detectors insure that the pulse coming in truly represents that of a colony and not merely a noise signal which survived its differentiation. To further insure the fact that a colony has in fact been detected, an adjustment is provided on the trailing edge detector indicated as a trail set signal 160 to insure that a pulse is detected on the trailing edge for each leading edge pulse. This insures that for each colony two separate signals are provided. One of the signals from the level detector serves to set the flip-flop while the other signal from the other detector serves to reset the flip-flop thereby producing a pulse at the output of the flip-flop whose width is representative of the colony along that horizontal scan line. The output from the flip-flop is passed through a gate 162 which is enabled by a signal on line 164 representing the window input. As heretofore explained with respect to FIG. 5, the window represents the total operational area and is generated in the control circuit, as will hereinafter be described. Only when the window input signal is present will the gate 162 permit the pulse to pass out of the quantizer at 166. This insures that no signals will be counted outside of the window area to produce an erroneous count. In addition, the window input also triggers a reset circuit 168 which causes flip-flop 158 to reset at the beginning of each television frame to avoid erroneous starting states of the flip-flop due to noise pulses which may be present between television frames.

Figure 9:
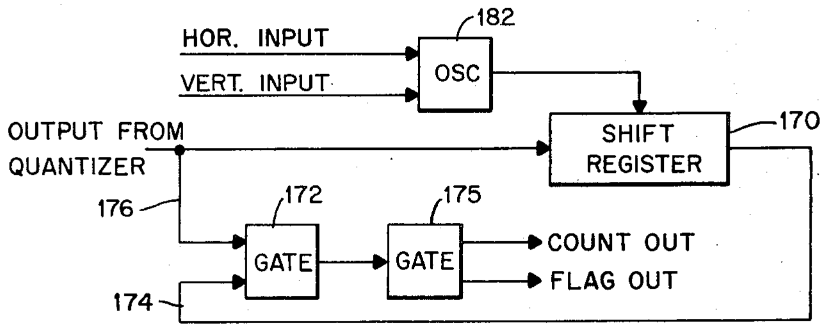
FIG. 9 is a block diagram of the shift register circuit.

The output from the quantizer 166 is fed into the shift register shown in detail in the block diagram of FIG. 9. The pulses representing the colonies for each horizontal scan line are clocked into the shift register by means of clock pulses from the oscillator 182. As each horizontal television scan line is read into the shift register, it retains the pulses and thereby effectively remembers where the pulses representing the colonies are along that horizontal scan line. As the next line is entered, the preceding line is clocked out and shifted into gate 172 along line 174. At the same time, the pulses from this next line also enter the gate 172 at line 176. Gate 172 compares the two lines to thereby inhibit count pulses for the same colony which will appear on subsequent scan lines. At the first appearance of a pulse representing a colony gate 172 sends a pulse to gate 175, which also includes appropriate flip-flop circuits to thereby produce both a flag output and a count output. The flag output is produced every time the colony is seen for the first time in each television frame. The count output also appears when the colony is first detected during a count period; however, no further outputs appear for duration of pulses representing the same colony.

Figure 10A:
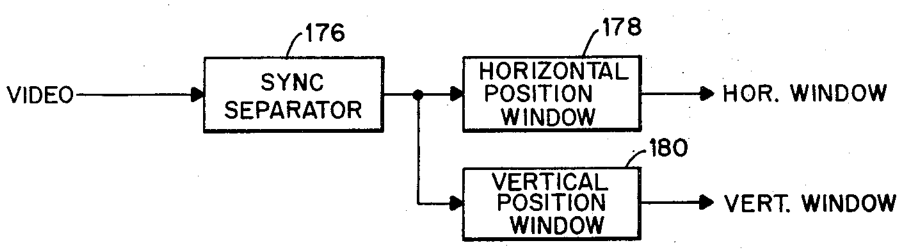
FIGS. 10A, 10B and 10C are block diagrams of the control circuit.
Figure 10B:
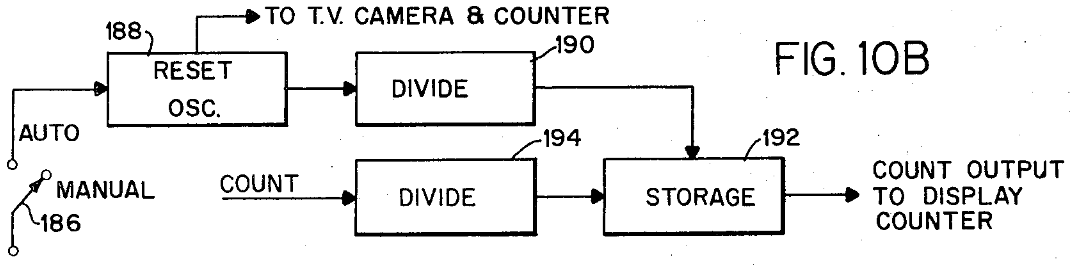
Figure 10C:
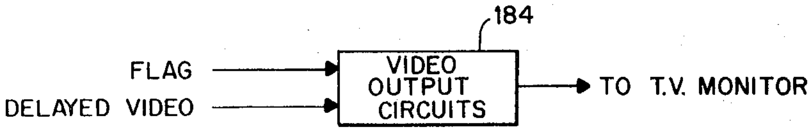

Referring now to FIGS. 10A through 10C, there are shown the various parts of the control circuit. In FIG. 10A the video signal direct from the television camera, in addition to being sent to the video processor heretofore described, is also sent to a synchronized separator 176 which separates the video signal into a horizontal and vertical window gate line. The horizontal position window 178 produces an output representing the limits in the vertical direction of the television frame and the vertical position window 180 produces an output representing the horizontal limits of the television picture. The horizontal and vertical window signals are used to produce the grid heretofore described. Referring back to FIG. 9, the window signals are sent to an oscillator 182 which provides clock pulses in a horizontal direction to effectively provide the horizontal grid. These clock pulses are also used to shift the information into shift register 170.

Referring to FIG. 10C, the flag signal from the shift register and gate, together with the delayed video from the video processor delay 130, is sent through video output circuits 184 in the control circuit which properly amplify and prepare the signals for display on the television monitor. In this manner, as each frame is scanned, the entire picture of the sample, together with the superimposed illuminated dots, can be viewed on the television monitor.

Referring now to FIG. 10B, there is shown the output circuit for the counter display as well as averaging circuitry. Switch 186, which corresponds to the automatic/manual switch 24, heretofore described with regard to FIGS. 1 through 4, is connected in series with a reset oscillator 188. When switch 186 is in automatic position, the reset oscillator triggers the camera to control the scan rate for a fixed time period. When in its manual position the system will scan only each time a button 28 contained on the front panel is depressed. The output from the reset oscillator 188 is sent to a divide circuit 190. In the present embodiment the number of the divisor is 16. The output from divide by 16 circuit 190 serves as a trigger input to a storage 192. The output count from the shift register shown in FIG. 9 is sent to another divide by 16 circuit 194, whose output serves as the input to the storage 192. The storage accumulates the total pulses averaged over the 16 frames and the output therefrom serves as the count output to the display counter shown in FIG. 6 as 118.

By using the divide by 16 circuits the actual count is effectively averaged to provide absolute accuracy in the television field counting. This is accomplished by taking the actual count and dividing it by 16 while at the same time using 16 successive television frames for counting purposes during a single time period. In this manner the count of a signal frame is divided by 16 and simultaneously multiplied by 16 such counts to provide a single accurate count of the colonies. It is to be noted, however, that the flag signal appears on each frame scanned without averaging.

Although not shown, the digital count output in addition to being displayed on a display counter, could also be used as the input for a printer or for a computer for further processing.

While the apparatus has been described as employing illumination which passes through the dish, it will be appreciated that the dish can be illuminated from the top and reflected light employed. This latter arrangement is particularly useful when either the background or the colony is opaque. Further, where desired colored filters may be employed to enhance contrast. Where the colonies are of irregular shape, the dish may be rotated say, 90°, for a second reading and the two readings averaged for a more accurate count. This procedure would be useful where colonies are figure eight-shaped, for example.

What has heretofore been described is an automatic colony counter which includes a television camera for viewing the sample being scanned. The output from the television camera is sent through control circuitry to a television monitor. The video signal is also processed and quantized to produce a digital count representing the number of colonies counted and also to produce the flag signal which causes an illuminated dot to be superimposed on each colony counted thereby, insuring that all the colonies in the sample have been in fact counted.

There has been disclosed heretofore the best embodiment of the invention presently contemplated. However, it is to be understood that various changes and modifications may be made by those skilled in the art without departing from the spirit of the invention.

What I claim as new and desire to secure by letters patent is:

1. A colony counting apparatus comprising:

support means for holding a sample containing colonies to be counted;

raster scan means focused onto said support means and providing a video output of the sample scanned;

video processing means receiving the video output from said scan means and converting it into a sequence of horizontal scan lines having a series of signals on each of said lines, each of said signals identifying a colony boundary;

quantizing means receiving said series of signals and producing therefrom pulses whose width represents the colony along each scan line;

gating means receiving the pulses from said quantizing means and combining pulses from sequential scan lines identifying the same colony and producing a single output signal for each colony;

counting means receiving said output signals from said gating means and providing a total count corresponding to the number of colonies;

control means receiving said video output from said raster scan means and processing it for display; and video display means receiving the output from said control means and displaying the scanned sample containing the colonies, and wherein said gating means also produces a flag signal at the detection of a colony, said flag signal being sent through said control means to said video display means to produce on said display means a superimposed illuminated dot on each colony detected.

2. Apparatus as in claim 1 further comprising digital display means connected to said counting means for displaying the total count.

3. An apparatus as in claim 2 and further comprising a C-shaped case wherein said support means is connected within the lower surface of the indented position of said case; said scan means is attached within the upper portion of the case facing downward toward the indented position; said quantizing means and counting means are both located in the bottom of said case and wherein said display means is located in the upper portion of the case adjacent said scan means and facing the front of said case being visible through an opening in the front of said case.

4. An apparatus as in claim 1 and wherein said control means includes delay means for delaying said video output from said scan means such that said flags will appear in proper time relationship superimposed over the displayed colonies.

5. An apparatus as in claim 1 further comprising:

reset means including an oscillator which resets said scan means and said counting means to scan the sample at a predetermined number of frames per period and producing a trigger signal each time said predetermined number is reached;

dividing means receiving the total count from said counting means at the end of each frame and dividing said total count by said predetermined number; and storage means for accumulating the divided counts from said dividing means and producing a final output value at the occurrence of said trigger signal.

6. An apparatus as in claim 5 and further comprising first switching means connected in series with said reset means having a first position wherein said reset means is connected into the apparatus and a second position wherein said reset means is disconnected from the apparatus, and second switching means connected to the second position permitting manual resetting of said scan means and said counting means.

7. An apparatus as in claim 1 and further comprising illuminating means located beneath said support means.

8. An apparatus as in claim 7 wherein said illuminating means includes a multiplicity of individual lamps.

9. An apparatus as in claim 7 and wherein said illuminating means includes a mercury vapor lamp formed into a zig-zag shape.

10. An apparatus as in claim 7 and further comprising diffusing means located between said illuminating means and said sample and spaced from said sample.

11. An apparatus as in claim 10 and wherein said diffusing means includes an opal glass.

12. An apparatus as in claim 1 and wherein said video processing means includes in series differentiation means, filter means and amplifier means.

13. An apparatus as in claim 1 and wherein said quantizer includes:

first level detection means receiving the signals from the video processing means representing the leading edge of each colony boundary;

second level detection means receiving the signals from the video processing means representing the trailing edge of each colony boundary; and circuit means connected to the outputs of said first and second detection means and producing a pulse whose width is determined by the time interval between the occurrence of said leading and trailing edges of each colony boundary.

14. An apparatus as in claim 13 and wherein said quantizer further includes checking means connected to said second level detection means and insuring that for each leading edge there follows a corresponding trailing edge.

15. An apparatus as in claim 1 and wherein said control means further includes:

synchronous separating means receiving said video output from said scan means and producing a window signal representing the total operational area of scanning; and oscillator means receiving said window signal as a control input and whose output is sent to said display means thereby producing a superimposed grid pattern within the window area.

16. An apparatus as in claim 1 and wherein said gating means includes:

shift register means receiving and holding information of an entire scan line and shifting out each position of said scan line as a position of a subsequent scan line is entered; and a gate whose one input is the shifted out position from said shift register and whose other input is the same information as that entering said shift register.

17. An apparatus as in claim 1 and wherein said video processing means, said quantizer means, and said gate means are comprised of removable plug-in printed circuit assembly cards.

18. A colony counting apparatus comprising:

support means for holding a sample containing colonies to be counted;

raster scan means focused onto said support means and providing a video output of the sample scanned;

video processing means receiving the video output from said scan means and converting it into a sequence of horizontal scan lines having a series of impulse signals on each of said lines, said impulse signals individually identifying the leading and trailing edges of a colony boundry;

quantizing means receiving said series of impulse signals and producing therefrom pulses whose width represents the colony along each scan line and further including checking means receiving said impulse signals and insuring that for each leading edge there follows a corresponding trailing edge;

gating means receiving the pulses from said quantizing means and combining pulses from sequential scan lines identifying the same colony and producing a single output signal for each colony; and counting means receiving said output signals from said gating means and providing a total count corresponding to the number of colonies.

* * * * *